(No Model.) 5 Sheets—Sheet 1.

E. G. RANKIN & J. TEMPEST.
BRICK MACHINE.

No. 519,590. Patented May 8, 1894.

WITNESSES: INVENTORS (No Model.) 5 Sheets—Sheet 2.

E. G. RANKIN & J. TEMPEST.
BRICK MACHINE.

No. 519,590. Patented May 8, 1894.

WITNESSES: INVENTORS.
Edwin G. Rankin
John Tempest.
By Kay, Totten & Cooke
Attorneys.

(No Model.) 5 Sheets—Sheet 5.

E. G. RANKIN & J. TEMPEST.
BRICK MACHINE.

No. 519,590. Patented May 8, 1894.

WITNESSES:
INVENTORS.
Edwin G. Rankin
John Tempest
By Kay, Tatem & Cooke
attorneys.

THE NATIONAL LITHOGRAPHING COMPANY,
WASHINGTON, D. C.

UNITED STATES PATENT OFFICE.

EDWIN G. RANKIN, OF MONONGAHELA CITY, AND JOHN TEMPEST, OF COURTNEY, PENNSYLVANIA.

BRICK-MACHINE.

SPECIFICATION forming part of Letters Patent No. 519,590, dated May 8, 1894.

Application filed September 15, 1893. Serial No. 485,541. (No model.)

*To all whom it may concern:*

Be it known that we, EDWIN G. RANKIN, a resident of Monongahela City, and JOHN TEMPEST, a resident of Courtney, county of Washington, State of Pennsylvania, have invented a new and useful Improvement in Brick-Machines; and we do hereby declare the following to be a full, clear, and exact description thereof.

Our invention relates to brick-machines, its special object being to provide a machine for making tubular bricks of different external shapes, such, for instance, as are used in steel pouring ladles, and in the pouring of steel castings, &c., such bricks being known as nozzle, runner bricks, stopper-rod sleeves, &c.

To these ends our invention comprises, generally stated, a suitable stationary frame supporting the reservoirs for receiving the clay and the molds for forming the brick, together with a reciprocating frame carrying pistons adapted to force the clay out of said reservoirs, and plungers adapted to enter the molds to force out the core of the clay, said pistons and plungers moving in opposite directions, together with certain other improvements and details of construction, all of which will be more fully hereinafter set forth and claimed.

To enable others skilled in the art to make and use our invention we will describe the same more fully, referring to the accompanying drawings, in which—

Figures 1, 10:
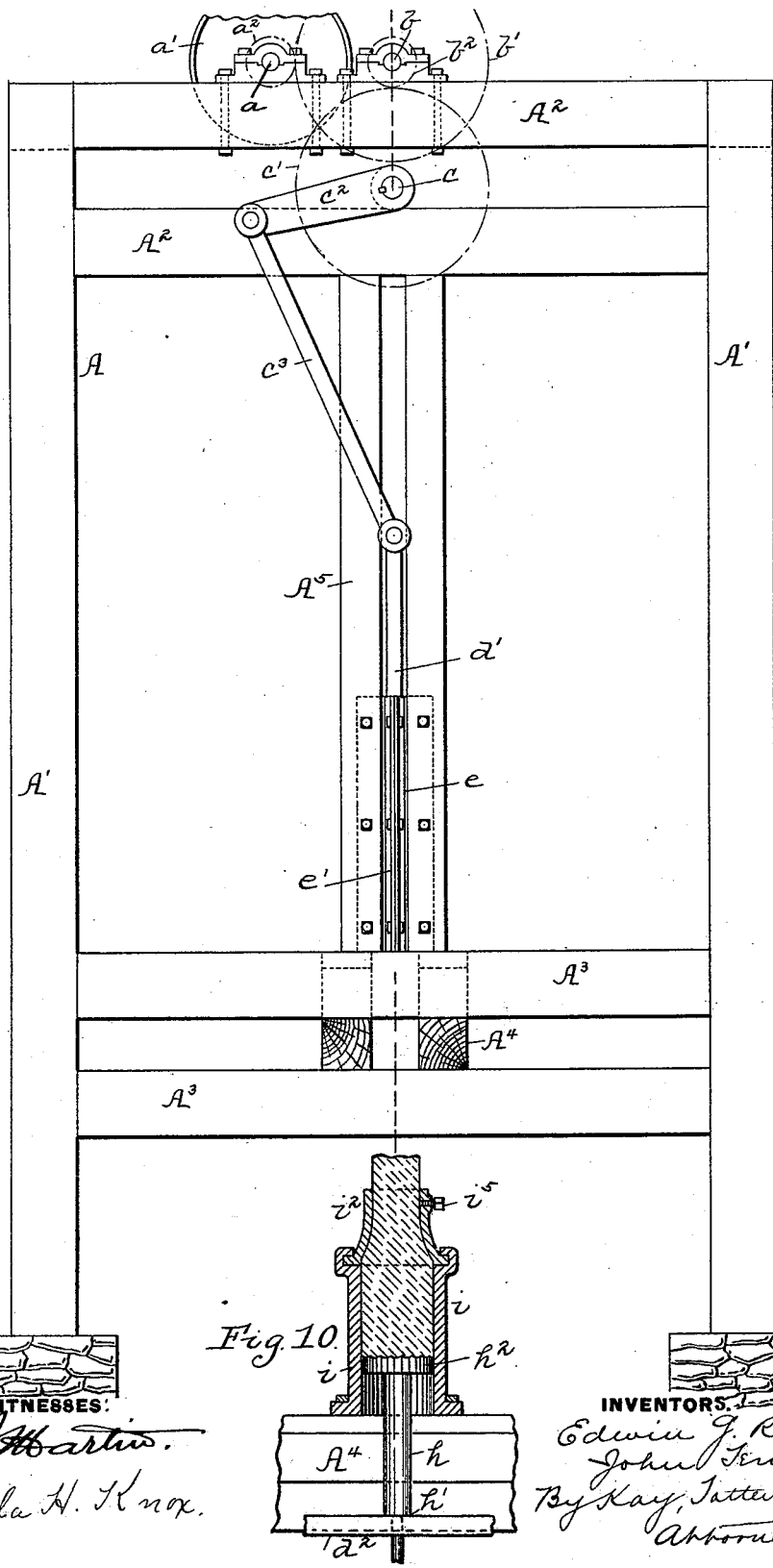
Figure 2:
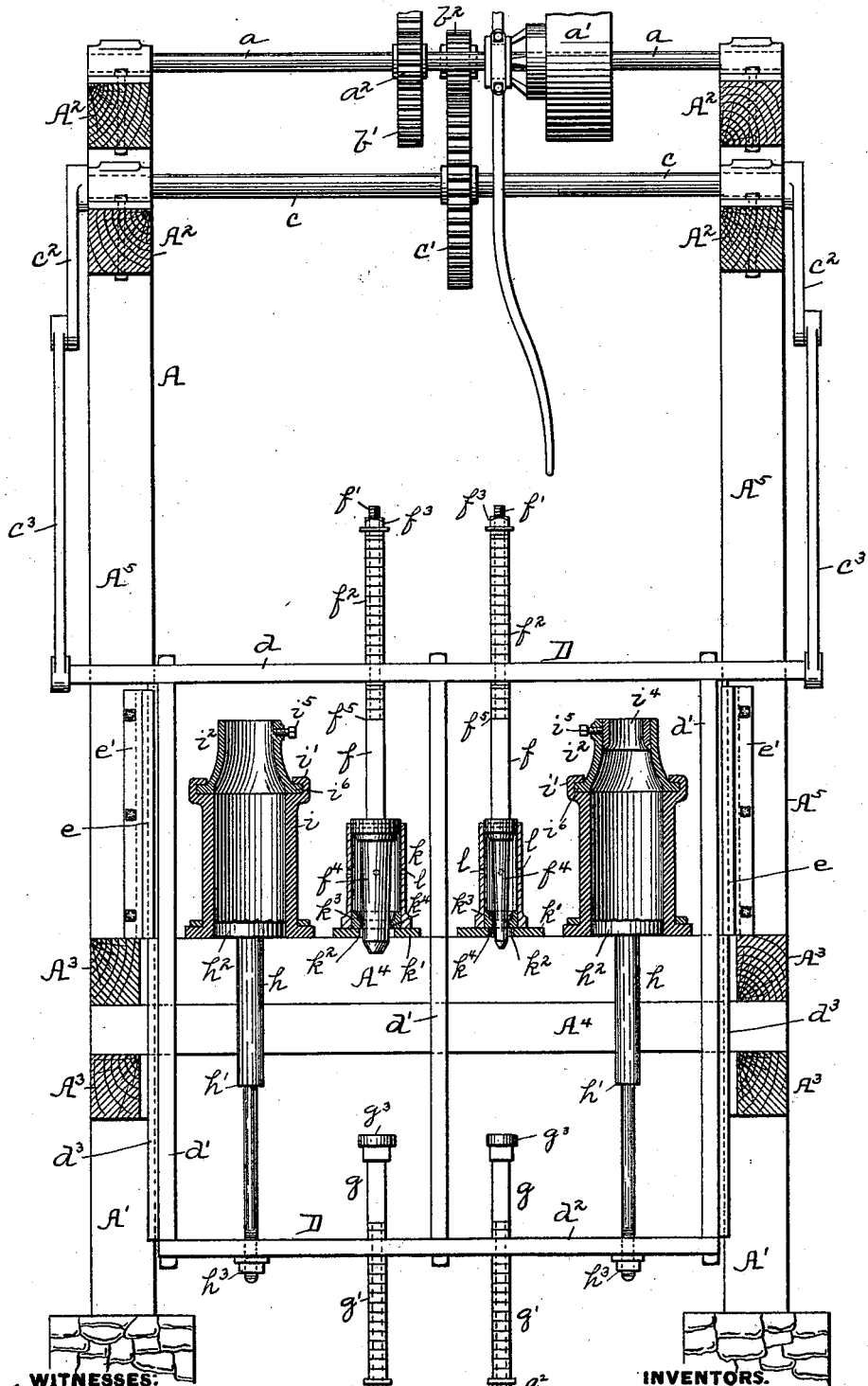
Figure 3:
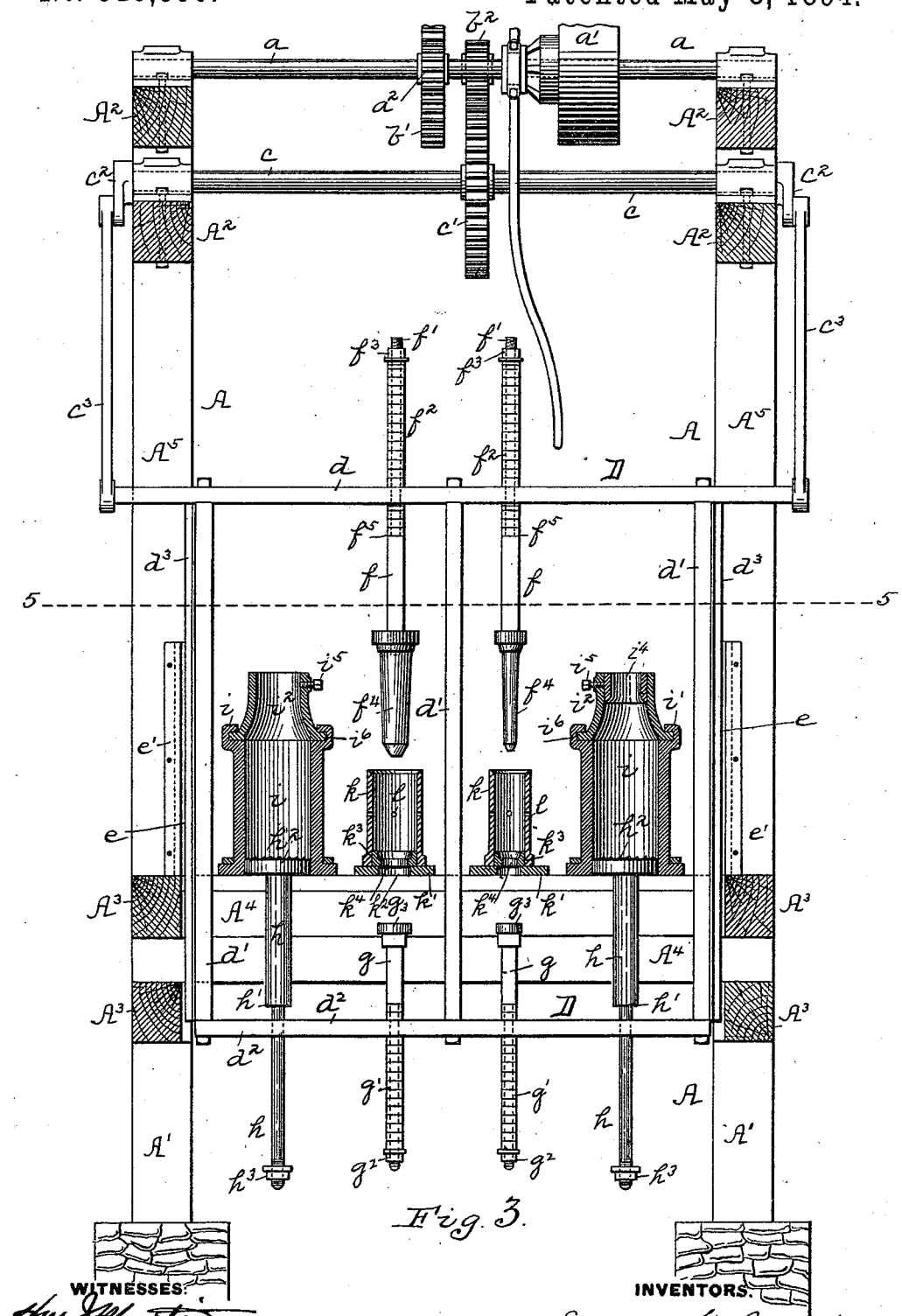
Figure 4:
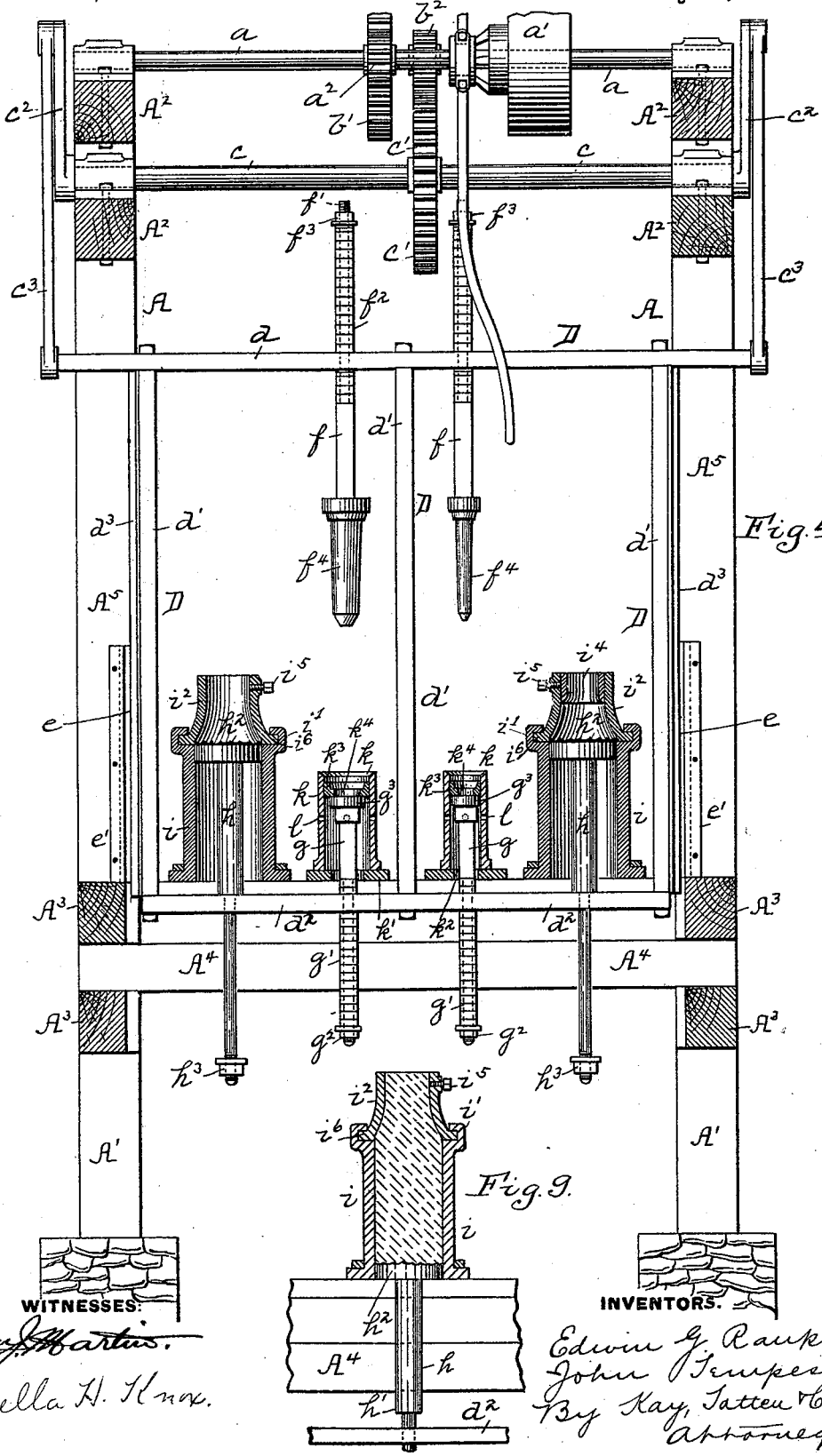
Figure 5:
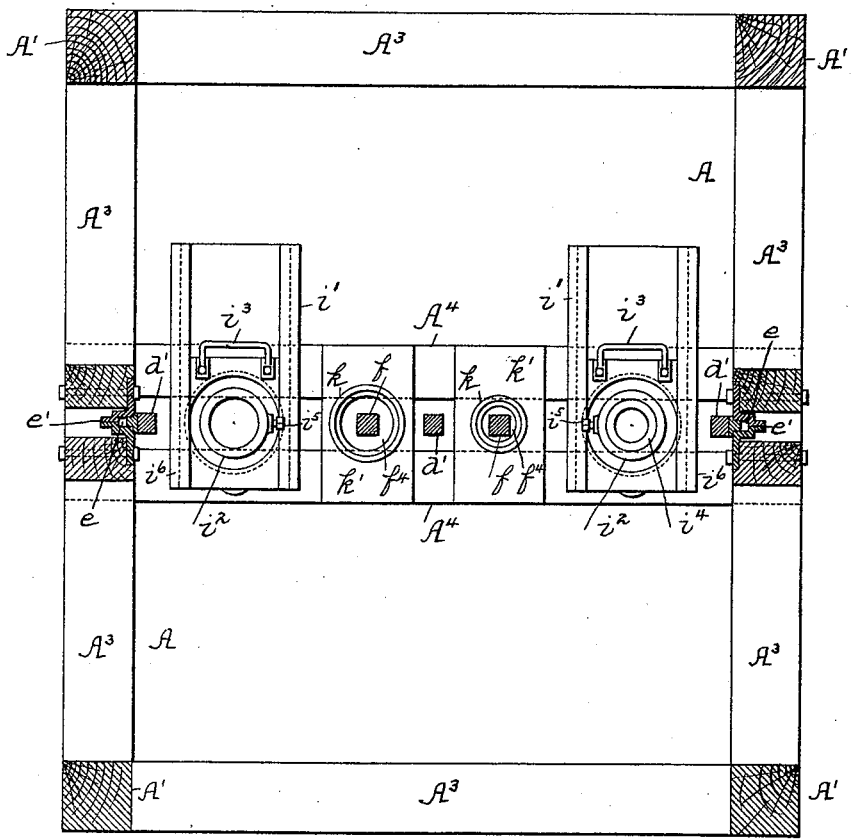
Figure 6:
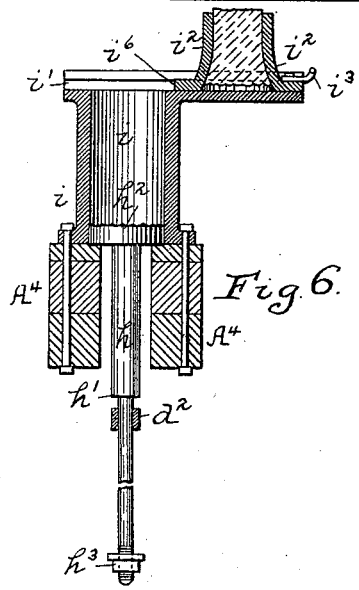
Figure 7:
Figure 8:
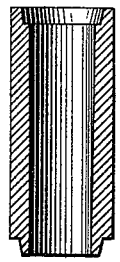

Figure 1 is a side view of our improved machine. Fig. 2 is a front view thereof. Fig. 3 is a like view showing the plungers in their partly elevated position. Fig. 4 is a like view showing the pistons in their elevated position. Fig. 5 is a sectional view on the line 5—5, Fig. 3. Fig. 6 is a detail sectional view of one of the reservoirs. Fig. 7 is an enlarged view of the clay as forced from the reservoir. Fig. 8 is an enlarged view of the finished brick. Figs. 9 and 10 are vertical sections of the reservoir showing the clay at different positions of the piston.

Like letters of reference indicate like parts in each.

The frame A is composed of the uprights A', the upper cross-beams $A^2$, the lower cross-beams $A^3$, the cross-beams $A^4$ which support the reservoirs and molds, and the vertical guide-beams $A^5$ which serve as a guide to the reciprocating frame, as will more fully hereinafter appear.

Journaled in suitable bearings in the upper end of the frame A is the power shaft $a$, said power shaft having secured thereto the pulley $a'$ to be connected with a suitable source of power by the customary belt. The gear wheel $a^2$ on said power shaft $a$ meshes with a gear wheel $b'$ on a shaft $b$ parallel with the shaft $a$ and journaled in suitable bearings, while said shaft $b$ has secured thereto a pinion $b^2$ which meshes with a gear wheel $c'$ on a shaft $c$, said shaft $c$ being journaled in suitable bearings in the frame A below said shafts $a$ and $b$.

Secured to the ends of the shaft $c$ are the short crank arms $c^2$, said short crank arms having pivoted thereto the long links $c^3$. The opposite ends of said long links $c^3$ are secured to the upper cross-bar $d$ of the reciprocating frame D, and as said reciprocating frame is constructed to work up and down within the guides formed by the vertical beams $A^5$, the ends of said upper cross-bar extend between said guide beams.

Secured to the upper cross-bar $d$ are the vertical connecting rods $d'$ which are secured at their lower ends to the lower cross-bar $d^2$ of the frame D. The outer connecting rods $d'$ are provided with the guide strips $d^3$, said rods being adapted to move up and down in the guides $e$ formed by the metal plates $e'$ bolted to the guide beams $A^5$.

Supported by the upper cross-bar $d$ are the plunger rods $f$, and in order to provide for the adjustment of said plunger rods at different heights, said rods having the circular stems $f'$ which pass up through openings in said cross-bar, and washers $f^2$ encircle said circular stems, resting on the shoulders $f^3$, so that by decreasing or increasing the number of washers above or below the point where said plunger rods $f$ pass through said cross-bar, said plunger rods may be adjusted at different heights as may be required. The upper ends of said plungers are threaded, and nuts $f^3$ engage said threaded portions to hold the washers in place. The lower ends of the plunger rods $f$ carry the plungers $f^4$. The shape of said plungers $f^4$ of course depends upon the internal shape to be given to the bricks to be formed.

Supported within the lower cross-bar $d^2$ of the frame D are the rods $g$, said rods passing up through openings in said cross-bar $d^2$, and held in position in a manner similar to the plunger rods $f$, being supplied with the washers $g'$ and the nuts $g^2$ for holding said washers in place, so that said rods $g$ are adjustable in the same manner as said plunger rods. The upper ends of said rods $g$ carry the pushing blocks $g^3$, the purpose of which will more fully hereinafter appear. Piston rods $h$ pass down through openings in said lower cross-bar $d^2$, said piston rods having shoulders $h'$ formed thereon, and carrying at their upper ends the pistons $h^2$, while at the lower ends of said piston rods are secured the nuts $h^3$. The pistons $h^2$ are constructed to fit closely within the reservoirs $i$, and are adapted to move up and down therein upon the reciprocation of the frame D, as will more fully hereinafter appear. These pistons $h^2$ have their upper faces indented, the purpose of which will appear hereinafter. These reservoirs $i$ are secured to the cross-beams $A^4$ in any suitable manner. The reservoirs $i$ may be of any convenient size, and are preferably formed of some suitable metal. As shown in Fig. 6, the upper ends of said reservoirs are provided with the flanges $i'$, which are inwardly projecting and which form suitable guides for the caps $i^2$, said caps being provided with the handles $i^3$. Within the caps $i^2$ may be secured dies $i^4$ of any suitable shape, said dies being held within caps by means of the set screws $i^5$, or any other suitable devices. The caps $i^2$ are made outwardly flaring at the lower ends thereof, but the inner walls thereof for some distance from the upper end thereof are vertical. At the right of Figs. 2, 3 and 4 the cap is shown with the die secured therein, said die being formed outwardly flaring at its lower end to correspond with the flare of the cap. The said caps are further provided with the flanges $i^6$ adapted to engage with the guides on said reservoirs. The cross-beams $A^4$ have bolted or otherwise secured thereto the molds $k$, said molds, of course, having any desired internal form to produce the desired shape on the exterior of the finished brick. The molds shown are circular in form, although we do not confine ourselves to any particular shape either in the molds or the reservoirs. The said molds $k$ rest upon the plates $k'$, and may be secured thereto in any convenient manner, said plates having openings $k^2$ formed therein corresponding to the size of the pushing blocks $g^3$ on the ends of the rods $g$. Within the said molds $k$ are the removable bottom rings $k^3$, said rings having openings $k^4$ formed therein of smaller size than the openings $k^2$, so that when the pushing blocks $g^3$ enter said openings $k^2$ they will act to engage the bottom rings $k^3$ and raise the same up within the molds $k$. The internal shape of the rings which form the bottoms $k^3$ of said molds $k$ may be made to correspond to the shape to be given to the lower end of the brick to be formed, and bottom rings of different internal shapes may of course be inserted into the same mold. The molds $k$ have formed in the sides thereof the openings $l$, the purposes of said openings being to relieve the pressure upon the descent of the plungers, and, furthermore, to force the clay into said openings, so that upon the ascent of the plungers the brick formed within the mold will not adhere to the said plungers and be removed therewith.

The operation of our improved apparatus is as follows:—As the reservoirs $i$ and molds $k$ illustrated are constructed to produce a cylindrical brick, we will describe the operation of the apparatus with reference to the production of bricks such as shown in section in Fig. 8. With the several parts of the apparatus in the positions shown in Fig. 2, the caps $i^2$ are grasped by the handles $i^3$ and moved in the guides $i'$ from over the reservoirs $i$. The reservoirs $i$ are then filled with the required amount of clay of the proper consistency, and when filled the caps are again pushed back into place over said reservoirs, the caps $i^2$ having first been provided with suitable dies in case it is desired to force the clay out of a smaller opening than the cap itself affords, such a die being shown in the right of Figs. 2, 3, 4 and 5, and in order to illustrate how the same reservoirs and caps may be employed to produce smaller blanks we have shown the mold on the right of smaller diameter than the one on the left in the said figures of the drawings. As shown in Fig. 2, the plungers $f^4$ will be down in the molds $k$. The power is then applied to operate the reciprocating frame D through the shafts and crank arms hereinbefore described. As the reciprocating frame rises the plungers $f^4$ will be carried out of the molds $k$, and the lower cross-bar $d^2$ will move up on the piston rods $h$ until said cross-bar comes in contact with the shoulders $h'$ on said piston rods. The rods $g$ carrying the piston rods $g^3$ will in the meantime have ascended a corresponding distance, the approximate positions of the several parts being shown in Fig. 3, in which the cross-bar $d^2$ has almost reached the shoulders $h'$ of the piston rods $h$. When the cross-bar $d^2$ has reached the shoulders $h'$ of the piston rods $h$ the pistons $h^2$ will then begin to ascend and force the clay contained within the reservoirs $i$ up through the openings or dies in the caps $i^2$, as is shown in Fig. 10. The pistons $h^2$ will advance for a short distance into the caps $i^2$, and, as the upper faces of said pistons are indented, they will be forced into the clay left within said caps and will form a correspondingly indented or jagged face on said clay, as shown in Fig. 6. It is apparent that the form of the clay forced from the caps $i^2$ will in this case be cylindrical in form, and of a diameter corresponding to the interior diameter of the caps $i^2$. The blanks thus forced from the reservoirs $i$ are immediately placed within the molds $k$. The reciprocating frame has at this stage of the operation approached its highest point, and upon its descent the plungers $f^4$ will descend and be forced into the clay within the molds $k$. As said plungers descend into said molds they will force the surplus clay through the openings in the bottoms of said molds and in the plates supporting the said molds. When the reciprocating frame has reached the position shown in Fig. 2 the plungers will have completed their descent and passed through the body of clay, forming a passage through the same, whereupon the reciprocating frame is again ready to ascend. In this manner the clay is compacted tightly within the mold and a passage formed through it, the lower ends of the plungers $f^4$ extending beyond the molds. In the meantime, during the descent of the reciprocating frame, the operators have removed the caps from the reservoirs $i$, and have refilled said reservoirs with the clay, and adjusted the caps again in place, so that upon the ascent of the reciprocating frame the reservoirs will all be filled ready for another operation of the machine. As the reciprocating frame again ascends the plungers will be withdrawn from the molds, as shown in Fig. 3, and upon the further ascent of the frame the pushing blocks $g^3$ will enter the openings $k^2$ in the supporting plates $k'$, and, engaging with the bottom rings $k^3$, will carry up said rings in their ascent, and, consequently, the finished bricks supported by said bottom rings, so that the operators can remove the finished bricks as they emerge from the molds in the shape shown in Fig. 8. Upon the removal of the finished bricks and upon the descent of the reciprocating frame, the bottom rings $k^3$ resting upon the pushing blocks $g^3$ will descend and resume their former position within the molds. In the meantime the pistons $h^2$ have again ascended to their highest point, and have forced out another set of blanks for inserting into the molds. As before stated in describing the first upward movement of the pistons, the lower faces of the clay left within the caps were indented or jagged by the faces of said pistons. The object of this indenting of the lower faces of the clay left within the caps $i^2$ is to strengthen the connection between the quantity of clay left within the caps and the clay which has been recently inserted into the reservoirs. It is thus apparent, that, upon the ascent of the pistons within the reservoirs, the indented faces of the clay left within the caps will enable a closer bond to be formed between the two portions of clay than where two smooth faces are forced into contact with each other. The clay in the reservoirs is forced by the pistons into contact with the indented faces of clay left within the caps, and a very close bond is formed between the two bodies of clay, so that the weak spots heretofore occurring in bricks formed by forcing two smooth surfaces of clay into conjunction are avoided.

Although we have illustrated our invention in connection with a machine using two reservoirs and two molds, we do not limit ourselves to any particular number, as it is apparent that the machine may be adapted for any capacity.

By the above form of apparatus we are enabled to make the odd shapes of fire bricks, such as are used in the construction of steel melting furnaces, &c., in great quantities, and much more perfect in construction than those produced by the apparatus generally employed. We do not, however, confine ourselves to any particular shapes or sizes of bricks.

What we claim as our invention, and desire to secure by Letters Patent, is—

1. In a brick machine, the combination with a suitable frame, of a reservoir, a mold, and a reciprocating piston and plunger constructed to operate within said reservoir and mold, respectively, substantially as and for the purposes set forth.

2. In a brick machine, the combination of a reservoir, a mold, and a reciprocating frame carrying a piston and a plunger at opposite ends thereof constructed to operate within said reservoir and mold, respectively, substantially as and for the purposes set forth.

3. In a brick machine, the combination of a reservoir, and a piston therein, said piston having an indented face, substantially as and for the purposes set forth.

4. In a brick machine, the combination of a mold, a reciprocating frame carrying a plunger and a pushing block at its opposite ends, a plate supporting said mold, said plate having an opening formed therein, and a removable bottom ring in said mold constructed to be elevated by said pushing block, substantially as and for the purposes set forth.

5. In a brick machine, the combination of a reservoir, a mold, a reciprocating frame, a rod supported at the upper end of said frame, said rod carrying a plunger constructed to enter said mold, a piston in said reservoir, a piston rod attached thereto, said piston rod having a shoulder in the path of the lower end of said reciprocating frame, substantially as and for the purposes set forth.

6. In a brick machine, the combination of a mold, a reciprocating frame, a plunger rod passing through an opening in said frame, said plunger rod having a shoulder formed thereon, a series of washers surrounding said rod above said shoulder and a nut engaging the upper end thereof, substantially as and for the purposes set forth.

7. In a brick machine, the combination with the frame A, of the reciprocating frame D, the vertical guide beams A⁴, the metal plates $e'$ and the guides $e$, substantially as and for the purposes set forth.

In testimony whereof we, the said EDWIN G. RANKIN and JOHN TEMPEST, have hereunto set our hands.

EDWIN G. RANKIN.
JOHN TEMPEST.

Witnesses:
J. N. COOKE,
ROBT. D. TOTTEN.